US006401063B1

(12) United States Patent
Hébert et al.

(10) Patent No.: US 6,401,063 B1
(45) Date of Patent: Jun. 4, 2002

(54) METHOD AND APPARATUS FOR USE IN SPEAKER VERIFICATION

(75) Inventors: Matthieu Hébert, Saint-Lambert; Stephen D. Peters, Pointe-Claire, both of (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/436,991

(22) Filed: Nov. 9, 1999

(51) Int. Cl.$^7$ .............................................. G10L 15/06
(52) U.S. Cl. ........................ 704/234; 704/246; 704/273
(58) Field of Search ................................. 704/234, 250, 704/256, 270, 275, 246, 273

(56) References Cited

U.S. PATENT DOCUMENTS

| | | | | |
|---|---|---|---|---|
| 5,522,012 A | * | 5/1996 | Mammone et al. | 704/250 |
| 5,893,902 A | * | 4/1999 | Transue et al. | 704/275 |
| 6,061,653 A | * | 5/2000 | Fisher et al. | 704/256 |
| 6,246,987 B1 | * | 6/2001 | Fisher et al. | 704/273 |

OTHER PUBLICATIONS

Rosenberg A. E. and Parthasarathy P. (1996) "Speaker background models for connected digit password speaker verification" Proc. ICASSP '96, pp. 81–84.

Gu Y. and Thomas T. (1998) "An Implementation and evaluation of an on–line speaker verification system for field trials" Proc. ICSLP '98, pp. 125–128.

Carey M.J. Parris E. S. and Bridle J.S. (1991) "A speaker verification system using alpha–nets" Proc. ICASSP '91, pp. 397–400.

Tomoko Matsui and Sadaoki Furui; "Speaker Recognition Technology"; NTT Review; vol. 7 No. 2; Mar. 1995; pp. 40–48.

\* cited by examiner

Primary Examiner—Marsha D. Banks-Harold
Assistant Examiner—Susan McFadden

(57) ABSTRACT

A method and apparatus for use in the field of speaker verification. The invention provides a method and apparatus for generating a pair of data elements, namely a first element representative of a speaker specific speech pattern and a second element representative of a biased normalizing template, the pair of data elements being suitable for use in a speaker verification system. The invention provides receiving an audio signal representative of a training token associated with a given speaker and processing the training token on a basis of a reference speaker independent model set to derive a speaker independent normalizing template. The invention further provides processing the training token on a basis of a reference speaker independent model set for generating a speaker specific speech pattern. The speaker specific speech pattern and the speaker independent normalizing template are then processed to derive a biased normalizing template. The pair of data elements is then in a format suitable for use by a speaker verification system. The invention further provides a computer readable medium containing a program element suitable for generating a pair of data elements suitable for use in a speaker verification system.

28 Claims, 8 Drawing Sheets

METHOD AND APPARATUS FOR USE IN SPEAKER VERIFICATION

FIELD OF THE INVENTION

This invention relates to the field of speaker verification and more particularly to a method and apparatus for generating certain data that is specific to a user and that can be used by a speaker verification system to authenticate the user based on a speech pattern. This invention is applicable to speech activated security systems such as access to voice-mail, automated telephone services, automated banking services and voice directed computer applications, among others.

BACKGROUND OF THE INVENTION

Speaker verification is the process of verifying whether a given speaker is a claimed speaker. The basis of this process lies on comparing a verification attempt with a speaker specific speech pattern representative of the claimed speaker and then calculating the likelihood of the verification attempt actually being generated by the claimed speaker. A common approach is to determine the likelihood of the verification attempt being generated by the claimed speaker given the speaker specific speech pattern. Typically, if the calculated likelihood is above a certain threshold then the verification attempt is accepted as being generated by the claimed speaker. Otherwise, the verification attempt is rejected. The level of the threshold depends on a number of factors such as the level of security required and therefore on the level of tolerance for false acceptance or false rejection.

Speaker verification systems can be characterized as being either password non-specific, where the verification is entirely done on the basis of the voice of the speaker, or password specific, where the speaker must utter a specific password in addition to having the proper voice. Password specific speaker verification systems are desirable because an additional level of security is added since the speaker must utter the correct password in addition to having a voice with the correct acoustic properties. In addition, password specific speaker verification systems may be desirable when a given functionality in a system using speaker verification is operatively linked to a given password.

A common approach for improving the speaker verification process is the use of normalizing techniques such as the world normalizing model, the background normalizing model and cohort normalization model. The world, background and cohort normalization models perform verification on the basis of a template representing the claimed speaker, and a template that is independent of the claimed speaker. The template representing the claimed speaker is herein referred to as the speaker specific speech pattern. The template that is independent of the claimed speaker is herein referred to as a normalizing template. In broad terms, normalizing techniques involve computing a likelihood score indicative of a probability that the verification attempt was generated by the claimed speaker and normalizing the likelihood score by a second score, herein referred to as the normalizing score. For additional information on the background, cohort and world normal-zing methods, the reader is invited to refer to Gu et al. (1998) "An Implementation and Evaluation of an On-line speaker Verification System for Field Trials" *Proc. ICASSP* '98, pp. 125–128 and to Rosenberg et al. (1996) "Speaker Background Models for Connected Digit Password Speaker Verification" *Proc. ICASSP* '96, pp. 81–84. The contents of these documents are hereby incorporated by reference.

In the cohort normalizing method, the normalizing template is indicative of a template representing the most competitive speaker specific speech pattern selected from a group of speaker specific speech patterns. This is done by scoring the verification attempt against various speaker specific speech patterns in a set of speaker specific speech patterns excluding the speaker specific speech pattern associated to the claimed speaker. The speaker specific speech patterns in the set are indicative of a same password uttered by different speakers. The highest scoring speaker specific speech pattern in the database of speaker specific speech patterns is retained as the most competitive speaker specific speech pattern for use in the normalizing process. The score of the verification attempt on the speaker specific speech pattern associated to the claimed speaker is compared to the score of the verification attempt on the most competitive speaker specific speech pattern in order to determine whether the given speaker is to be accepted as the claimed speaker or not.

Mathematically the cohort normalizing method can be expressed as follows:

$$\log L(O) = \log p(O|\lambda_c) - \max\{\log p(O|\lambda_i)\}$$

where L(O) is the likelihood of a verification attempt observation O, $p(O|\lambda c)$ is a probability that the observation O corresponds to the parameters given by $\lambda c$, representative of the speaker specific speech pattern associated to the claimed speaker, and $p(O|\lambda i)$ is a probability that an observation O corresponds to the parameters given by $\lambda i$, which represents a set of speaker specific speech patterns other than the speaker specific speech patterns associated to the claimed speaker; $\max\{\log p(O|\pi_c)\}$ represents the logarithmic likelihood of the most competitive speaker specific speech pattern.

In the background normalizing method, the normalizing template is derived by combining speaker specific speech models from a set of speech models associated to possible imposters to form a template. The speech models selected to be part of the normalizing template are typically derived on a basis of a similarity measurement. The score of the verification attempt of speaker specific pattern associated to the claimed speaker is compared to the normalizing template in a manner similar to that described in connection with the cohort normalizing method.

Methods of the type described above require a database of speaker dependent models to create the normalizing template. Performance is closely tied to the contents of the database of speaker specific models. Optimally, the database of speaker specific models should contain the speaker specific models associated to a probable imposter trying to access the system. Having a database containing a priori a complete set of speaker specific models is prohibitive to create.

Another common method is the world normalization model. In this method, instead of performing verification on the basis of the score of the speaker specific speech pattern associated to the claimed speaker and of many possible speaker specific speech patterns, the verification is done on the basis of a speaker specific speech pattern associated to the claimed speaker and of a single world template or speaker independent template. A speaker independent model set generated from a large number of speech samples collected from a large number of speakers uttering a plurality of words is used to generate a speaker independent template representative of an average pronunciation of a specific word by an average speaker. In other words, the speaker independent model set allows creating an approximation of the actual pronunciation of the specific word since the pronunciation was generated from a plurality of uttered words.

The world normalization method does not require a database of speaker dependent models and is therefore more flexible than the cohort and background model methods. A deficiency of the world normalization model is a lower performance in terms of speaker verification for a given acceptance/rejection threshold since the world normalizing model is an overgeneralization of the pronunciation of the specific word considered.

Consequently, there is a need in the industry for providing a method and apparatus for generating an improved normalizing template for use in a speaker verification system.

SUMMARY OF THE INVENTION

In accordance with a broad aspect, the invention provides an apparatus for creating a biased normalizing template suitable for use by a speaker verification system to authenticate a speaker based on a speech pattern. The speech pattern is representative of a first set of speech characteristics. The apparatus comprises an input for receiving an input signal representative of a speech pattern from a given speaker. The apparatus further comprises a processing unit coupled to the input for receiving the input signal. The processing unit is operative for processing the input signal and a first data element representative of a speaker independent normalizing template representative of a second set of speech characteristics to derive a second data element representative of an altered version of the user independent normalizing template. The second data element forms a biased normalizing template representative of a third set of speech characteristics, where the third set of speech characteristics is a combination of the first set of speech characteristics and the second set of speech characteristics. The apparatus further comprises an output for releasing an output signal conveying the biased normalizing template suitable for use by a speaker verification system.

In a specific example of implementation, the first set of speech characteristics and the second set of speech characteristics define extremes of a range of speech characteristics, the range of speech characteristics including the third set of speech characteristics.

Under this specific example of implementation, the processing unit is further operative for processing the input signal to derive the first data element representative of the speaker independent normalizing template representative of the second set of speech characteristics. More specifically, the processing unit is operative to process the input signal on a basis of a reference speaker independent model set to derive the first data element.

In a specific example, the apparatus is part of a speaker verification system.

An advantage of this invention is that it provides high performance speaker verification without requiring a database of speaker dependent model sets.

In accordance with another broad aspect, the invention provides a method for generating a pair of data elements. The first element is representative of a speaker specific speech pattern and the second element representative of a biased normalizing template. The pair of data elements is suitable for use in a speaker verification system. The method comprises receiving an audio signal derived from a spoken utterance forming a training token associated with a given speaker. The method also comprises processing the audio signal on a basis of a reference speaker independent model set to derive a speaker independent normalizing template. The method further comprises processing the training token on a basis of a reference speaker independent model set for generating a speaker specific speech pattern. The method also comprises processing the speaker specific speech pattern and the speaker independent normalizing template to derive a biased normalizing template. A signal indicative of the pair of data elements in a format suitable for use by a speaker verification system is then released.

In accordance with another broad aspect, the invention further provides an apparatus for implementing the above-described method.

In accordance with another broad aspect, the invention provides a computer readable medium comprising a program element suitable for execution by a computing apparatus for implementing the above-described method.

In accordance with another broad aspect, the invention further provides a computer readable medium containing a verification database comprising entries generated by the above-described method.

For the purpose of this specification, the expression "model" and "speech model" are used to designate a mathematical representation of the acoustic properties of a sub-word unit. Modeling sub-word units is well-known in the art to which this invention pertains. Commonly used models include Hidden Markov Models (HMMs) where each sub-word unit is represented by a sequence of states and transitions between the states.

For the purpose of this specification, the expression "template" is used to designate a sequence of models indicative of a word or sequence of words. The expression "template" should be giver a broad interpretation to include an electronic representation of the models themselves, a sequence of symbols each symbol being associated to a respective model, a sequence of pointers to memory locations allowing to extract the models or any other representation allowing a sequence of models can be extracted.

Other aspects and features of the present invention will become apparent to those ordinarily skilled in the art upon review of the following description of specific embodiments of the invention in conjunction with the accompanying figures.

DETAILED DESCRIPTION

Figure 1:
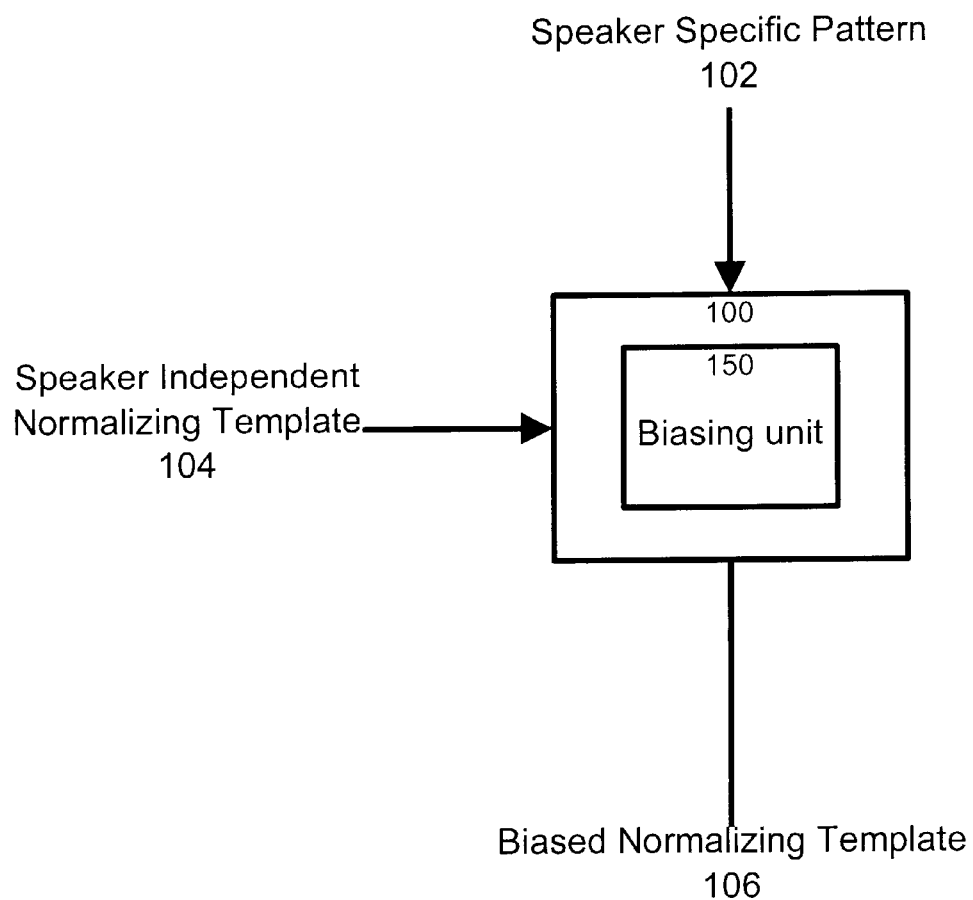
FIG. 1 shows a block diagram of an apparatus for creating a biased normalizing template in accordance with an embodiment of the invention.

In a preferred embodiment, as shown in FIG. 1, the invention provides an apparatus 100 for creating a biased normalizing template suitable for use by a speaker verification system. The apparatus 100 comprises an input 102 for receiving the speaker specific speech pattern associated with the given speaker, a processing unit 150 coupled to the input and an output 105 coupled to the processing unit 150. The processing unit 150, herein referred to as the biasing unit 150, is operative for processing the speaker specific speech pattern received at the input 102 to derive a biased normalizing template for output at the output 106 on the basis of a speaker independent normalizing template. In accordance with the specific example of implementation, the apparatus 100. further comprises a second input 104 for receiving a speaker independent normalizing template.

In a first form of implementation, the speaker independent normal-zing template received at the second input 104 is comprised of a set of sub-word units roughly representative of the acoustic properties of a password uttered by an average speaker. In a specific example, each sub-word unit in the speaker independent normalizing template is a speech model such as a Hidden Markov Model (HMM). In a more specific example of implementation, the sub-word units are speech models indicative of allophonic models having three states, each state having a five component mixture of Gaussians. Other formats for the speaker independent normalizing template may be used without detracting from the spirit of the invention and are well. known in the art to which this invention pertains. In a specific example, the speech models in the speaker independent normalizing template are derived from a reference speaker independent model set. The reference speaker independent model set is generally derived from a large number of speech samples collected from a large number of speakers uttering a plurality of words. The generation of a speaker independent model set is well known in the art to which this invention pertains and will not be described in further detail.

The speaker specific speech pattern received input 102 is indicative of a sequence of sub-word units representative of the acoustic properties of a password uttered by a specific speaker. In a specific example, each sub-word unit in the speaker specific speech pattern is a speech model such as a Hidden Markov Model (HMM). In a more specific example of implementation, the sub-word units are speech models indicative of allophonic models having three states, each state having a five component mixture of Gaussians. Other formats for the speaker specific speech pattern indicative of the acoustic properties of a specific speaker may be used without detracting from the spirit of the invention and are well known in the art to which this invention pertains.

The biased normalizing template released at output 106 is indicative of a sequence of sub-word units representative of the acoustic properties of a password. The biased normalizing template is in a format similar to that of the speaker specific speech pattern received at input 102.

The biasing unit 150 is operative to combine the speaker independent normalizing template and the speaker specific speech pattern to generate the biased normalizing template for output at output 106. In a specific example of implementation, the biasing unit 150 conditions the speaker independent normalizing template using a maximum a posteriori adaptation method on the basis of the speaker specific speech pattern. For more information on using maximum a posteriori (MAP) adaptation, the reader is invited to consult Gauvain et al. (1994), "maximum a posteriori estimation for multivariate Gaussian mixture observations of Markov chains", IEEE Transaction Speech Audio Process. 2, pages 291 to 298. The content of this document is hereby incorporated by reference. The speech pattern is representation of a first set of speech characteristics. The speech independent normalizing template is indicative of a second set of speech characteristics. The biased normalizing template is indicative of a third set of speech characteristics. The first set and the second set of speech characteristics define extremes of a range of speech characteristic, including the third set of speech characteristics. The biased normalizing template can then be stored on a computer readable medium for use by a speaker verification unit.

In a second form of implementation, the speaker specific speech pattern and the speaker independent normalizing template are embodied in vectors in a mean parameter sub-space. The mean parameter subspace is a subspace of the model parameter space, the latter which is spanned by the means, the covariances and the weights of the speech models. The mean parameter subspace is described in this specification for the purpose of example only. It will be readily apparent to those skilled in the art that other subspaces of the model parameter space (such as the covariance subspace and the weights subspace) may be used without departing from the spirit of the invention. A large number of enrollment tokens is preferable when using as the covariance subspace and the weights subspaces which may be inconvenient in most applications. A template or speaker specific speech pattern in the mean parameter subspace is represented by a single vector:

$$\mu=[\mu_1^t \mu_2^t \ldots \mu_M^t]^t$$

where $\mu_1$ are multi-entity components indicative of the means of the M speech models in the speaker independent normalizing template and the speaker specific speech pattern. If all the means are not tied to a single global covariance, the $\mu_1$s may be considered in a transformed space (after multiplication by the inverse Cholesky factor of the covariance matrix).

In the mean parameter sub-space, each component of the vector comprises the means of each speech model characterizing a given password. The speaker specific speech pattern and the speaker independent normalizing template are each indicative of a point in a multi-dimensional space, each point of the multi-dimensional space representing a sequence of acoustic sub-word units. In other words, the vector is created by concatenating the means of each model. The means may be further processed without detracting from the spirit of the invention. The vector can be considered as a point in a multi-dimensional space indicative of the acoustic properties of an utterance.

A specific example will better illustrate the above. Suppose the speaker specific speech pattern and the speaker independent normalizing template are indicative of vocabulary item "four" and that this vocabulary item can be mapped onto transcription /for/. The speaker specific speech pattern and the speaker independent normalizing template embodied in vectors may be represented by the following:

$$SD=[\mu_f^D \mu_o^D \mu_r^D]$$

$$SI=[\mu_f^I \mu_o^I \mu_r^I]$$

Where SD is the speaker specific template; SI is the speaker independent normalizing template; $\mu_x^D$ is a multidimensional component comprising the means of sub-word unit "x" in the speaker specific template; and $\mu_x^I$ is a multidimensional component comprising the means of sub-word unit "x" in the speaker independent normalizing template. By construction, SD and SI pair-wise have the same complexity.

The biased normalizing template released at output 106 is indicative of a third vector of a format similar to that of the speaker independent normalizing template and the speaker specific speech pattern. In other word, the biased normalizing template is indicative a point in the multi-dimensional space that is intermediate to the points in the multi-dimensional space associated to the speaker specific speech pattern and the speaker independent normalizing template.

The biasing unit 150 is operative to condition the speaker independent normalizing template by obtaining a weighted sum of the speaker specific speech pattern and the speaker independent normalizing template. Mathematically, this can be expressed using the following formula:

$$\mu_j^B = (1-\alpha)\mu_j^I + \alpha\mu_j^D \text{ for } j=1 \ldots M$$

Where $\mu_j^I$, $\mu_j^D$ and $\mu_j^B$ are multidimensional components comprising the means of sub-word unit "j" of the speaker independent normalizing template, the speaker specific speech pattern and the biased normalizing template respectively; M is the number of sub-word units in the password and $\alpha$ is a free parameter. Preferably, $0 \leq \alpha \leq 1$ such that the biased normalizing template is indicative of a point in the mean parameters sub-space intermediate to the speaker specific speech pattern and the speaker independent normalizing template. In a specific embodiment, a value of $0.2 \leq \alpha \leq 0.6$ is used. Other values may be used without detracting from the spirit of the invention. The biased normalizing template can then be stored on a computer readable medium for use by a speaker verification unit.

Advantageously, by conditioning the speaker independent normalizing template on the basis of the speaker specific speech pattern, an improvement in the speaker verification process can be obtained. The verification scores obtained by using the biased normalizing template allow the scores of imposters to be negatively influenced during normalization without substantially affecting the scores for valid speakers and consequently improving performance.

In a variant, the apparatus is further operative for processing the speaker specific speech pattern to derive the speaker independent normalizing template on a basis of a reference speaker independent model set. In this variant, each acoustic sub-word unit in the speaker specific speech pattern is associated to a label which can be mapped to a model in the reference speaker independent speech model set, whereby allowing the speaker independent normalizing template to be generated. This is effected by sequentially extracting from the reference speaker independent speech model set the speech models corresponding to each respective label in the speaker specific speech pattern and concatenating the extracted speech models to form the speaker independent normalizing template. In this variant, the second input 104 is not required.

Figure 3:
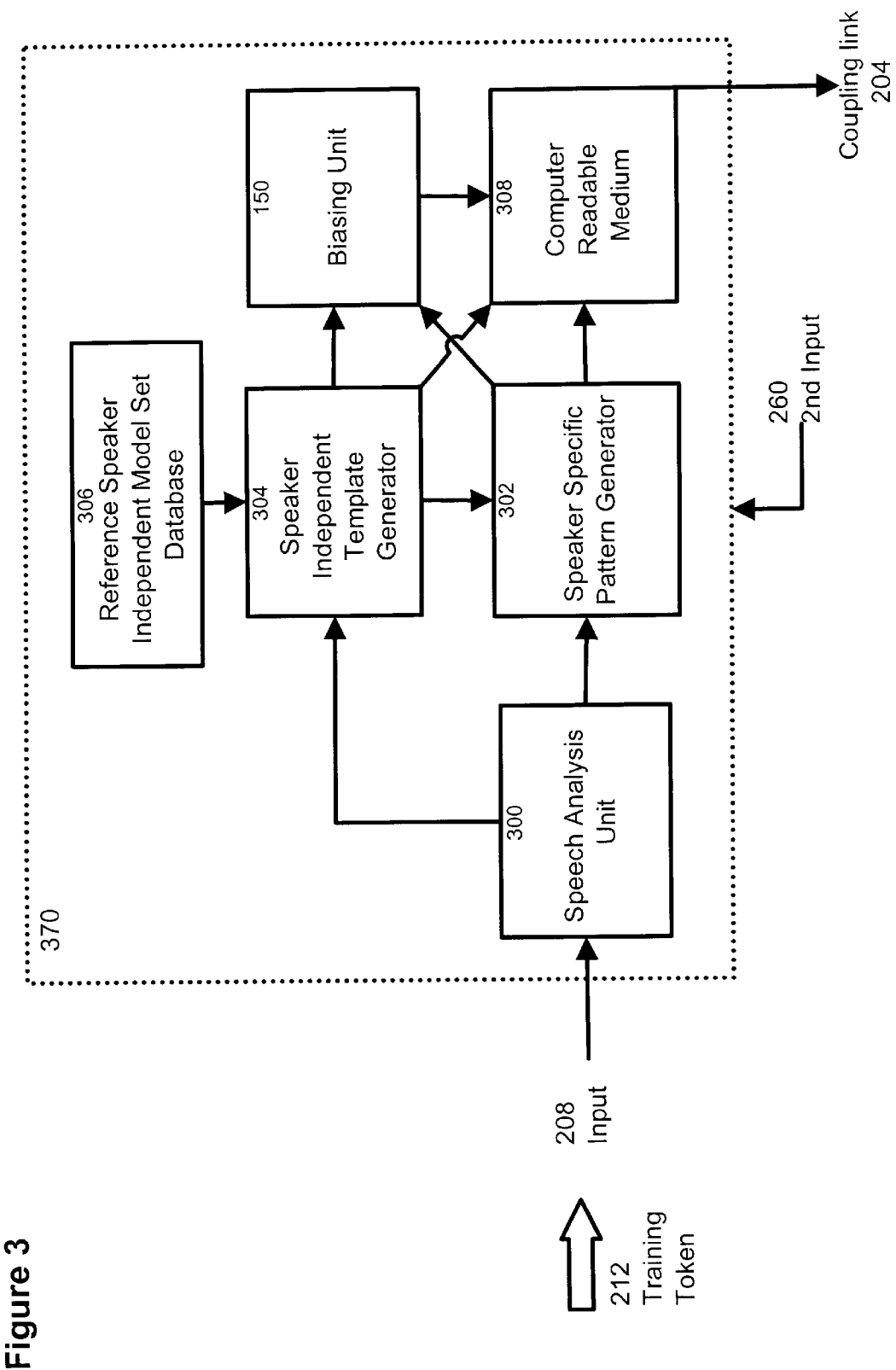
FIG. 3 shows a detailed block diagram of an apparatus for generating a pair of data elements in accordance with an embodiment of the invention.

In a specific form of implementation, the apparatus 100 for creating a biased normalizing template is integrated into an apparatus for generating a pair of data elements, namely a first element representative of a speaker specific speech pattern and a second data element representative of a biased normalizing template, the pair of data elements being suitable for use in a speaker verification system. FIG. 3 of the drawings shows a detailed block diagram of a specific example of implementation of the apparatus for generating the pair of data elements suitable for use in a speaker verification system. As shown, the apparatus 370 comprises an input 208 for receiving an audio signal representative of a training token 212 associated with a given speaker, a set of functional modules forming a processing unit and an output 204 for releasing a signal indicative of the pair of data elements.

The processing unit is operative for processing the training token 212 on a basis of a reference speaker independent model set 306 to derive a speaker independent normalizing template. The processing unit is further operative to process the training token 212 on a basis of a reference speaker independent model set 306 for generating a speaker specific speech pattern and for processing the speaker specific speech pattern and the speaker independent normalizing template to derive a biased normalizing template. The processing unit is further coupled to the output 204 for releasing a signal indicative of the speaker specific speech pattern and the biased normalizing template in a format suitable for use by a speaker verification system. The pair of data elements is associated to the specific speaker.

In a specific example of implementation, the processing unit comprises a speaker specific speech pattern generator unit 302, a speaker independent template generator unit 304 and a biasing unit 150 coupled to the speaker independent template generator unit 304 and the speaker specific speech pattern generator unit 302. In a specific example of implementation, the processing unit further comprises a speech analysis unit 300, a reference speaker independent model set database 306 and a computer readable storage medium 308.

The input 208 is operative to receive audio waves representative of the training token 212 and convert them into an electronic signal. The input device 208 may be a microphone or telephone set, or any device suitable to map a spoken utterance into an electric signal suitable to be processed by electronic components. In a specific example, the training token 212 is derived from an audio signal associated to a specific speaker. In a specific example of implementation, the training token is indicative of a password that the specific user wishes to register in the speaker verification system. The password may be a single word such as "Buffy", a short series of words such as a set a numbers "4-9-9-6", or a complete sentence such as "Mary had a little lamb whose fleece was white as snow" without detracting from the spirit of the invention.

The speech analysis unit 300 is coupled to the input 208 and is operative to receive the electronic signal and extract the acoustic parameters associated with the training token 212. The speech analysis unit 300 may form a part of the apparatus 370 or may be a separate component operatively connected to the apparatus 370 without detracting from the spirit of the invention. In a specific example of implementation, the speech analysis unit is operative to map the speech utterance into a sequence of feature vectors indicative of the acoustic properties of the utterance. In a more specific example of implementation, the feature vectors are indicative of Mel-based cepstral parameters. Feature vectors are well known in the art to which this invention pertains and will not be described further. As a variant, a set of training tokens 212 can be provided by the specific speaker in order to account for variations in pronunciation by a same specific speaker. In a specific example, the set comprises about four spoken training tokens. Other numbers of training tokens may be used without detracting from the spirit of the invention. While the speaker is uttering a subsequent utterance, the feature vectors previously derived by the speech analysis unit 300 may be stored on a computer readable medium such as a RAM or mass storage device until the set of utterances has been processed by the speech analysis unit 300.

The speaker independent template generator unit 304 is operative for processing the training token 212 on a basis of a reference speaker independent model set to derive the speaker independent normalizing template. In a specific example of implementation, the speaker independent template generator 304 is coupled to a reference speaker independent model set database 306, the speech analysis unit 300, and the speaker specific speech pattern generator 302. The reference speaker independent model set 306 comprises a plurality of speech models associated to sub-word units. The speech models may be concatenated to form a match to a spoken utterance. In a specific example of implementation, the speech models are indicative of Hidden Markov Models (HMM). In a more specific example of implementation, the reference speaker independent model set database comprises 800 allophone speech models, each comprising three states, each state having a five component mixture of Gaussians. Other speech models may be used in the context of this invention without detracting from its spirit as will be readily apparent to those skilled in the art. Reference speaker independent model sets of the type suitable for use in the context of the present invention are available as off-the-shelf components and are well known in the art to which this invention pertains. The speaker independent template generator 304 makes use of the parameters generated by the speech analysis unit 300 to derive a speaker independent normalizing template having the best total maximum likelihood, the speaker independent normalizing template comprising a sequence of sub-word units, each sub-word unit in the speaker independent normalizing template being associated to a speech model in the reference speaker independent model set database 306. Deriving a speaker independent template is well-known in the art of speech recognition and will not be described further. The output of the speaker independent template generator is a speaker independent normalizing template indicative of a most probable way a specific vocabulary item corresponding to the training token 212 would be uttered by an average speaker. The speaker independent normalizing template may be embodied in a vector in a mean parameter sub-space or in the form of a set of sub-word units as described in connection with FIG. 1 of the drawings. The speaker independent normalizing template is then released by the speaker independent template generator 304.

The speaker specific speech pattern generator unit 302 is operative for processing the training token on a basis of the reference speaker independent model set 306 to generate a speaker specific speech pattern. In a specific example of implementation, the speaker specific speech pattern generator 302 is coupled to the speech analysis unit 300 for receiving the set of parameters and to the speaker independent template generator 304 for receiving the speaker independent normalizing template. The speaker specific speech pattern generator 302 conditions the speech models in the speaker independent normalizing template on the basis of the parameters received from the speech analysis unit 300 to generate a speaker specific speech pattern. A specific example of a method that can be used to effect the conditioning of the speaker independent normalizing template is a maximum a posteriori adaptation method. For more information on using maximum a posteriori (MAP) adaptation, the reader is invited to consult Gauvain et al. (1994), "maximum a posteriori estimation for multivariate Gaussian mixture observations of Markov chains", IEEE Transaction Speech Audio Process. 2, pages 291 to 298. The speaker specific speech pattern generator outputs a data element indicative of a speaker specific speech pattern. The speaker specific speech pattern represents a most probable way a specific word would be uttered by a specific speaker. The speaker specific speech pattern is in a format similar to that of the speaker independent normalizing template. The speaker specific speech pattern is then released by the speaker independent template generator.

The biasing unit 150 comprises inputs for receiving a speaker specific speech pattern and a speaker independent normalizing template. The biasing unit is operative to process the speaker specific speech pattern and the speaker independent normalizing template to derive the biased normalizing template in a manner similar to that described in connection with FIG. 1 of the drawings. The biased normalizing template is indicative of a template that is intermediate between the speaker specific speech pattern and the speaker independent normalizing template. The biasing unit further comprises an output for releasing a data element indicative of a biased normalizing template.

The generated speaker specific speech pattern and the biased normalizing template form a pair of data elements associated to a specific user.

In a specific example of implementation, the generated pair of data elements is stored in a data structure on a computer readable medium 308. In a specific example, the computer readable medium 308 is a mass-storage device, diskette, ROM unit or any other suitable device. The computer readable medium 308 may form part of the apparatus 370 or may be an external device operatively connected to the apparatus 370 by a data communication link. The data structure may take on many different formats without detracting from the spirit of the invention. In a specific example, the data structure is in the form of a table having a plurality of records, each record comprising the pair of data elements associated to a specific speaker. In another specific example of implementation, each record comprises the pair of data elements and a speaker independent normalizing template associated to a specific speaker. In a specific example of implementation, the computer readable storage medium 308 stores a plurality of records, each record being associated to a respective identifier data element allowing to retrieve a record from the computer readable medium.

Preferably, the apparatus 370 further comprises a second input 260 suitable for receiving a data element indicative of an identifier associated with a specific speaker. The identifier received at the second input 260 is stored along with the record associated to the specific speaker, whereby allowing the extraction of a record on the basis of the identifier. The identifier data element associated to the speaker may be his name, telephone number, or a magnetic swipe card proper to that specific speaker. The identifier data element provided at the second input 260 may be obtained from the user or automatically generated without detracting from the spirit of the invention.

In a specific example of implementation, the apparatus 370 for generating a pair of data elements suitable for use in a speaker verification system comprises a processor coupled to a computer readable storage medium, the computer readable storage medium comprising a program element for execution by the processor for implementing the processing unit. As a variant, the processing unit is a hardware device such as a ROM or other chip programmed on the basis of the above-described functionality.

Figure 6:
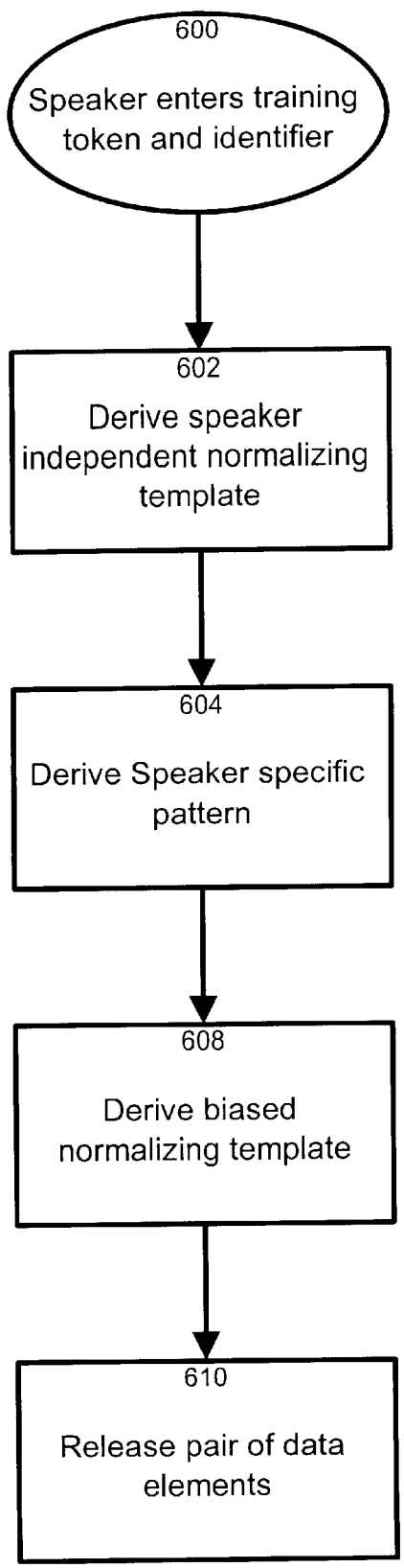
FIG. 6 shows a high-level, flow chart of a method for training a speaker verification system in accordance with an embodiment of the invention.

In accordance with another aspect, the invention is embodied in a method for generating a pair of data elements, namely a first data representative of a speaker specific speech pattern and a second data element representative of a biased normalizing template, the pair of data elements being suitable for use in a speaker verification system. As shown in FIG. 6 of the drawings, the method comprises receiving 600 an audio signal representative of a training token associated with a given speaker. Optionally, the training token is associated to an identifier data element associated to the given speaker. The method further provides processing the training token on a basis of a reference speaker independent model set to derive 602 a speaker independent normalizing template. In a specific example of implementation, step 602 may be effected by the same methods discussed in conjunction with the speech analysis unit 300 and the speaker independent template generator 304 in FIG. 3 of the drawings and optionally the variants on the speaker independent template generator 304. The method further comprises processing the training token on a basis of a reference speaker independent model set to derive 604 a speaker specific speech pattern. In a specific example of implementation, step 604 may be effected by the same methods discussed in conjunction of the speaker specific speech pattern generator 302 in FIG. 3 of the drawings and optionally the variants on the speaker specific speech pattern generator 302. The method further provides processing the speaker specific speech pattern and the speaker independent normalizing template to derive 608 a biased normalizing template. In a specific example of implementation, step 608 may be effected by the same methods discussed in conjunction of the biasing unit 150 in FIG. 1 of the drawings optionally the variants on the biasing unit 150. Preferably, the biased normalizing template is indicative of a template that is intermediate to the speaker specific speech pattern and the speaker independent normalizing template. The method further comprises releasing 610 a signal indicative of the pair of data elements in a format suitable for use by a speaker verification system.

As a variant, the method may further comprise storing the pair of data elements in a data structure on a computer readable medium. In a specific example, the computer readable medium is embodied as described in conjunction of he computer readable storage medium 308 in FIG. 3 of the drawings and optionally the variants on the computer readable medium 308. The data structure may take on many different formats without detracting from the spirit of the invention. In a specific example, the data structure is in the form of a table having a plurality of records, each record comprising a pair of data elements associated to a specific speaker. In another specific example of implementation, each record comprises a pair of data elements and a speaker independent normalizing template associated to a specific speaker. In a specific example of implementation, the computer readable storage medium stores a plurality of records, each record being associated to a respective identifier data element allowing to retrieve a record from the computer readable medium.

In yet another variant, the method further comprises receiving an identifier indicative of the given speaker, the identifier allowing to characterize a given record as being associated to the given speaker. The identifier is stored along with the record associated to the specific speaker, whereby allowing the extraction of a record on the basis of the identifier. The identifier data element associated to the speaker may be his name, telephone number, another password or even a magnetic swipe card proper to that specific speaker. The identifier data element may be provided by the given speaker or may be automatically generated without detracting from the spirit of the invention.

Figure 2:
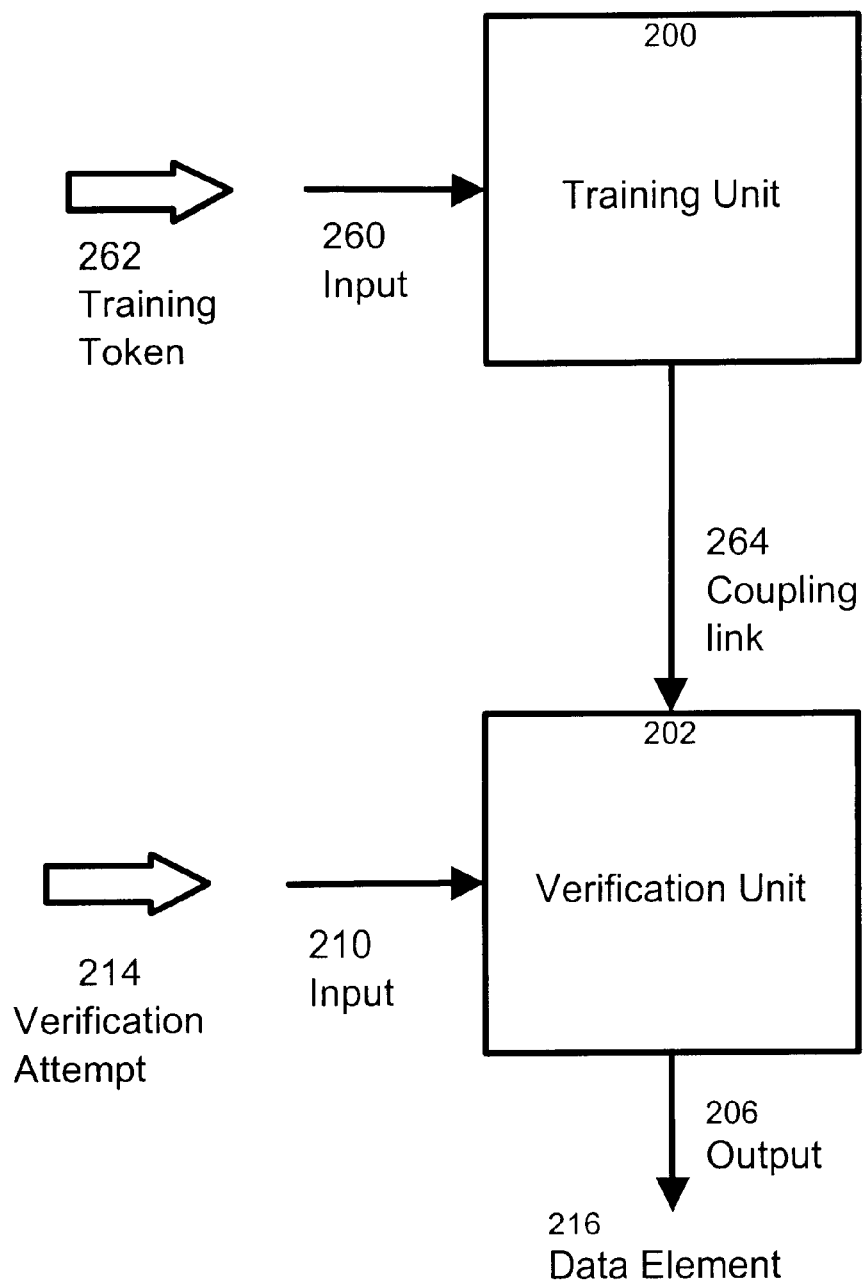
FIG. 2 shows a high-level block diagram of a speaker verification system in accordance with an embodiment of the invention.

The method and apparatus described above may be integrated into a speaker verification system of a type shown in FIG. 2 of the drawings. Such a system typically comprises two functional blocks namely a training unit 200 and a verification unit 202. The verification unit 202 is coupled to the training unit 200 by a coupling link 264. The speaker verification system further comprises an output 206 for releasing a data element 216 indicative of whether the verification attempt 214 is successful or unsuccessful.

The training unit 200 comprises an input 260 from receiving a signal indicative of a training token 262. The training unit 200 further comprises an output connected to the coupling link 264 for communicating with the verification unit 202.

The verification unit 202 comprises a first input 210 for receiving a verification attempt 214 and a second input operatively connected to the coupling link 264 for communicating with the training unit 200. In an alternative embodiment, input 260 and input 210 correspond to the same physical input, i.e., the training token 262 and the verification attempt 214 are received at the same input. The verification unit 202 is operative to process a verification attempt 214 on a basis of a speaker specific speech pattern and a biased normalizing template associated to a claimed speaker to generate a data element indicative of whether the speaker verification attempt is successful or unsuccessful.

In a first form of implementation, the training unit 200 is implemented substantially as the apparatus 370 for generating a pair of data elements described in connection with FIG. 3 of the drawings. The input 208 for receiving a training token 212 and the output 204 of the apparatus 370 correspond respectively to the input 260 for receiving a training token 262 and the output 264 of the training unit 200. The computer readable medium 308 comprises a set of records, each record being associated to a respective speaker. Each record comprises a speaker specific speech pattern and a biased normalizing template and optionally a speaker independent normalizing template.

Figure 5A:
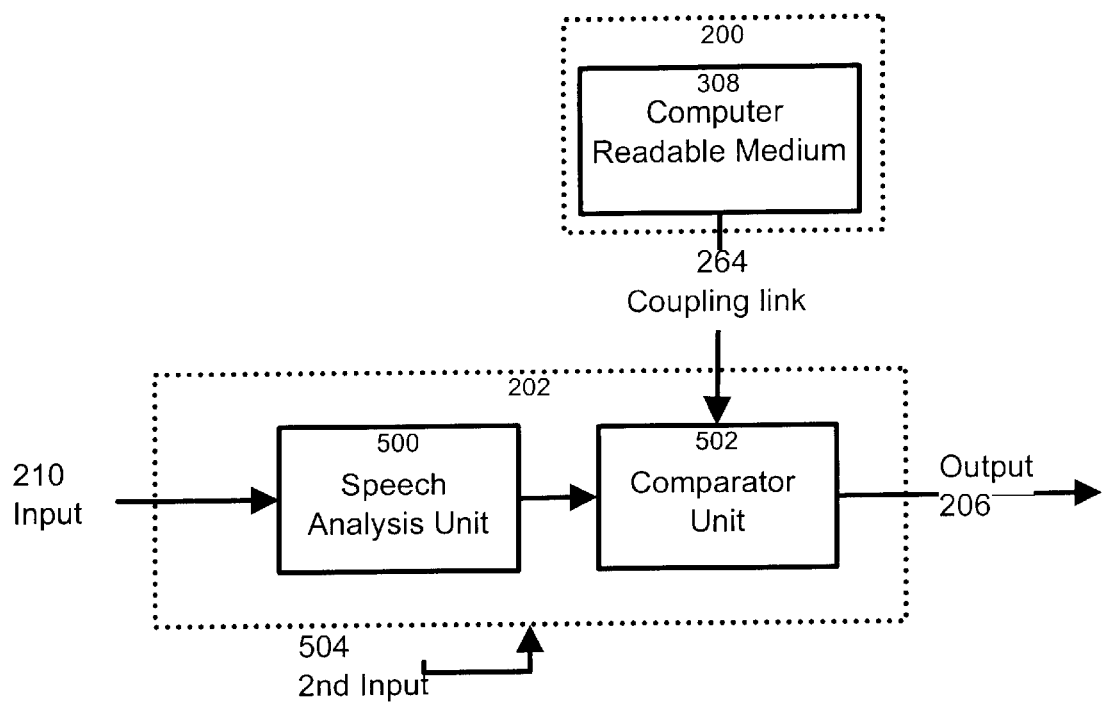
FIG. 5a shows a detailed block diagram of the verification unit of the system depicted in FIG. 2 in accordance with an embodiment of the invention.

An embodiment of the verification unit suitable for use in the first form of implementation of the training unit 200 is shown in FIG. 5a of the drawings. The verification unit 202 is indicative of an apparatus for performing speaker verification comprising a first input 210 for receiving a verification attempt for verification against a claimed speaker. The verification unit 202 further comprises a second input 264 for receiving a speaker specific speech pattern and a biased normalizing template associated with the claimed speaker. The verification unit 202 further comprises a processing unit coupled to the first 210 and second 264 inputs operative to process the verification attempt 214 on a basis of the speaker specific speech pattern and a biased normalizing template. The processing unit generates a data element indicative of whether the speaker verification attempt is successful or unsuccessful. The verification unit 202 further comprises an output 206 for releasing the data element indicative of whether the speaker verification attempt is successful or unsuccessful.

In a specific example of implementation, the processing unit of the verification unit 202 comprises a speech analysis unit 500 and a comparator unit 502. The speech analysis unit 500 is coupled to the input 210 and is operative to receive an electronic signal to extract the acoustic parameters associated with the verification attempt 214. In a specific example of implementation, the speech analysis unit 500 may be implemented in a manner substantively similar to that described in connection with the speech analysis unit 300 in FIG. 3 of the drawings. In an alternative embodiment, the speech analysis unit 300 and speech analysis unit 500 are implemented as a same physical unit. In other words, the training unit 200 and the verification unit 202 make use of a same speech analysis unit. Advantageously, sharing the speech analysis unit between the training unit 200 and the verification unit 202 allows a reduction in the number of components in the speaker verification system. Optionally, the verification unit further comprises a second input 504 for receiving an identifier data element associated to a claimed speaker. The second input 504 can be in the form of a computer keypad, a telephone keypad, a magnetic swipe card, or any other suitable input device. In an alternative embodiment, input 260 of the training unit corresponds to the second input 504 whereby a single input is required for receiving the identifier data element for the training unit of the verification unit.

The comparator unit 502 comprises an input for receiving acoustic parameters associated with the verification attempt 214 and a record associated to a claimed speaker. The record is extracted from a computer readable medium 308 on a basis of an identifier associated with the claimed speaker. In a specific example of implementation, a record comprises a speaker specific speech pattern and a biased normalizing template and a speaker independent normalizing template. The speaker verification as performed by comparator unit 502 is done using logarithmic likelihood in the following manner:

$$\log L(O) = \log p(O|\lambda_{SD}) - \max\{\log p(O|\lambda_{SI}), \log p(O|\lambda_{BSI})\}$$

where L(O) is the likelihood of a verification attempt 214 for an observation O, $p(O|\lambda_{SD})$ is the probability that an observation O corresponds to the parameters given by $\lambda_{SD}$ indicative of the speaker specific speech pattern, $p(O|\lambda_{SI})$ is the probability that observation O corresponds to the parameters given by $\lambda_{SI}$ indicative of the speaker independent normalizing template, and $p(O|\lambda_{BSI})$ is the probability that observation O corresponds to the parameters given by $\lambda_{BSI}$ indicative of the biased normalizing template. The above-described method is herein referred to as the constrained method. The resulting logarithmic likelihood $\{\log L(O)\}$ is then compared against a threshold value to generate a data element indicative of whether the verification attempt is successful or unsuccessful In a specific example, if the logarithmic likelihood $\{\log L(O)\}$ is above or equal to the threshold, a data element indicative of a successful verification attempt is generated and, if the logarithmic likelihood $\{\log L(O)\}$ is below the threshold, a data element indicative of an unsuccessful verification attempt is generated. In a specific example, the threshold is determined on a basis of experimentation. The comparator unit 502 then releases the data element.

In another specific example of implementation, a record comprises a speaker specific speech pattern and a biased normalizing template and a speaker independent normalizing template. The speaker verification is performed on a basis of an augmented biased normalizing template. The augmented biased normalizing template is derived on a basis of the biased normalizing template and the speaker independent normalizing template by merging, on a state basis, the sub-word units of the biased normalizing template and the speaker independent normalizing template. In a specific example, the augmented biased normalizing template is generated by merging the means and the weights associated to models in the speaker independent normalizing template and the biased normalizing template. More specifically, of the models of the biased normalizing template and the speaker independent normalizing template each have 3 states and 5 means, the models of the augmented biased normalizing template will have 3 states and 10 means. Merging the biased normalizing template and the speaker independent normalizing template is easily achieved by methods well-known in the art since there exists a correspondence between the states of the models in the biased normalizing template and the speaker independent normalizing template. The speaker verification is done using logarithmic likelihoods in the following manner:

$$\log L(O) = \log p(O|\lambda_{SD}) - \log p(O|\lambda_{AUG})$$

where $p(O|\lambda_{AUG})$ is the probability that observation O corresponds to the parameters given by $\lambda_{AUG}$ indicative of the augmented biased normalizing template.

This method is referred to as the unconstrained method. The resulting logarithmic likelihood is then compared against a threshold value to generate a data element indicative of whether the verification attempt is successful or unsuccessful in a manner similar to that described previously. In a specific example, the threshold is determined on a basis of experimentation. The comparator unit 502 then releases the data element.

In an alternative example of implementation, the comparator unit 502 performs speaker verification using a vector projection method. This embodiment is particularly useful when the speaker specific speech pattern and the biased normalizing template are indicative of vectors such as vectors in a mean parameter subspace. The verification attempt 214 is first processed to derive a vector in a format and manner similar to that of the speaker specific speech pattern, the biased normalizing template and the speaker independent normalizing template. The length of the normalized projection of the vector indicative of the difference between the verification attempt and the biased speaker independent normalizing template on the vector indicative of the difference between the biased speaker independent normalizing template and the speaker specific speech pattern is computed. Mathematically, this computation can be expressed as follows:

$$P_{BSI,\|} = \frac{(V - BSI) \cdot (SD - BSI)}{|SD - BSI|^2}$$

where V is a vector indicative of the verification attempt; SD is a vector indicative of the speaker specific speech pattern and BSI is a vector indicative the biased normalizing template. Typically, $P_{BSI,\|}$ tends to be between 0 and 1 and is indicative of a probability that the verification attempt corresponds to the speaker specific speech pattern as normalized by the biased normalizing template. $P_{BSI}$ is then compared against a threshold to determine whether the verification attempt is successful or unsuccessful. In a specific example, the threshold is determined experimentally. The above described method of calculating a projection makes use of a projection parallel to the vector indicative of the difference between the speaker specific pattern and the biased normalizing template. Alternatively, a perpendicular projection may be used. Mathematically, the perpendicular projection can be expressed as follows:

$$P_{BSI,PERP} = \frac{|V - BSI - P_{BSI,\|}(SD - BSI)|}{|SD - BSI|}$$

$P_{BSI,PERP}$ is then compared against a threshold to determine whether the verification is successful or unsuccessful. In a specific example, the threshold is determined experimentally. In yet another alternative example, $P_{BSI,\|}$ and $P_{BSI,PERP}$ are used in combination to evaluate the verification attempt. The quantities $P_{BSI,\|}$ and $P_{BSI,PERP}$ can be interpreted to define a two-dimensional decision space. Decisions as to whether the verification attempt is successful or unsuccessful is effected on the basis of the position of a point defined by the actual values of $P_{BSI,\|}$ and $P_{BSI,PERP}$ in the two-dimensional space. More specifically, the position of the point defined by $\{P_{BSI,\|}, P_{BSI,PERP}\}$ is compared against a threshold curve in the two dimensional decision space to determine whether the verification attempt is successful or unsuccessful. In a specific example, the threshold curve is determined experimentally.

Figure 4:
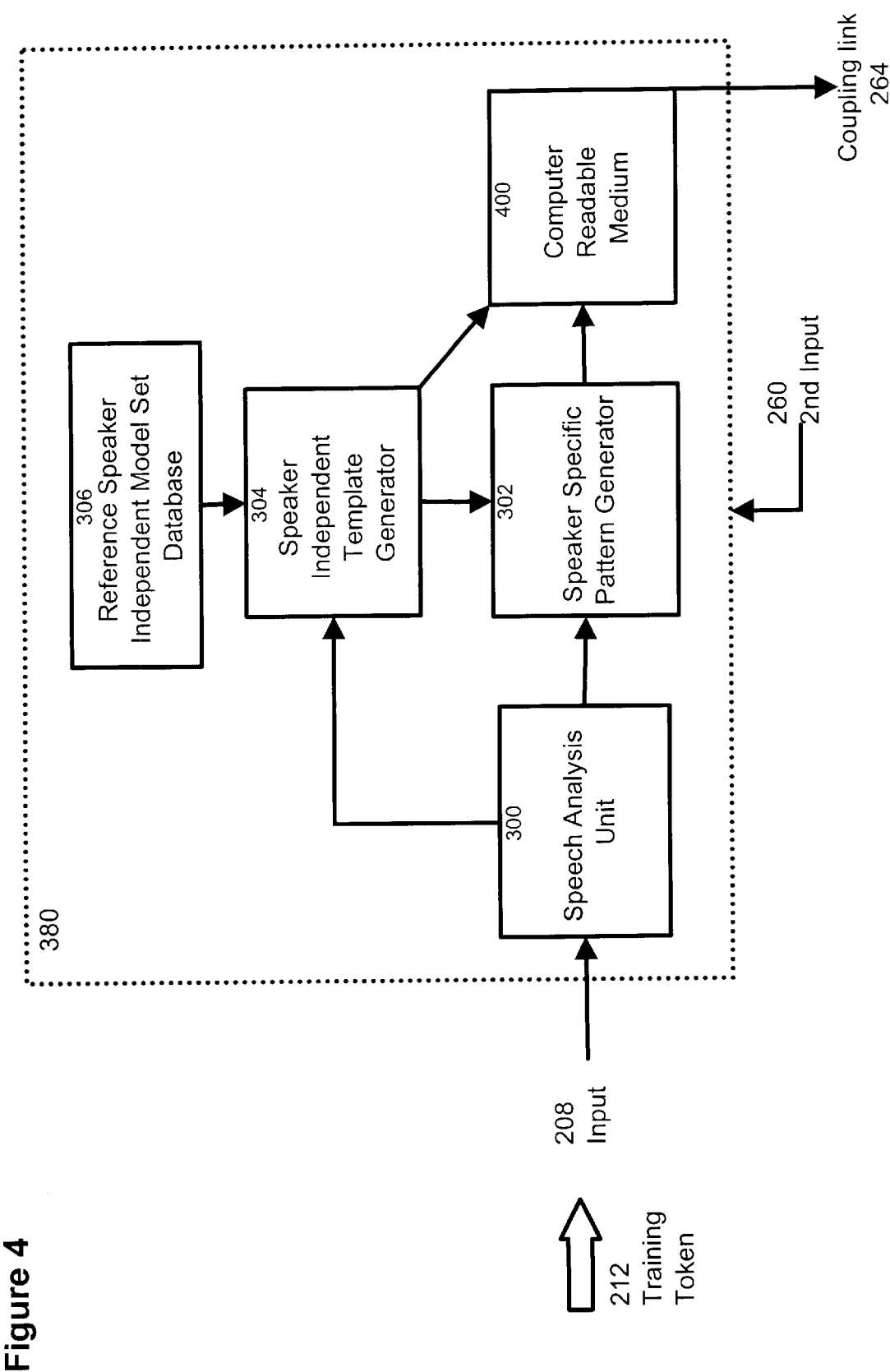
FIG. 4 shows a detailed block diagram of the training unit of the system depicted in FIG. 2 in accordance with an alternative embodiment of the invention.

In a second specific form of implementation, the training unit 200 is implemented without the biasing unit 100. A block diagram of a training unit in accordance with the second specific example is shown in FIG. 4 of the drawings. As shown the training unit 200 corresponds to block 380 and comprises an input 208 for receiving a training token 212, a speech analysis unit 300, a speaker specific speech pattern generator 302, a speaker independent template generator 304, a reference speaker independent model set database 306 and a computer readable medium 400. Blocks 300 302 304 and 306 as well as input 208 were previously described in the context of the apparatus shown in FIG. 3 of the drawings. The computer readable medium comprises a data structure for storing the speaker specific speech pattern generated by the speaker specific speech pattern generator 302 and the speaker independent normalizing template generated by the speaker independent template generator 304. In a specific example, the computer readable medium 400 is a mass-storage device, diskette, ROM unit or any other suitable device. The computer readable medium 400 may form part of the apparatus 380 or may be an external device operatively connected to the apparatus 380 by a data communication link. The data structure may take on many different formats without detracting from the spirit of the invention. In a specific example, the data structure is in the form of a table having a plurality of records, each record comprising a speaker specific speech pattern and a speaker independent normalizing template associated to a specific speaker. In another specific example of implementation, each record comprises a speaker specific speech pattern associated to a specific speaker. in a specific example of implementation, the computer readable storage medium 400 stores a plurality of records, each record being associated to a respective identifier data element whereby allowing to retrieve a record from the computer readable medium 400 on the basis of the identification data element. The computer readable medium is operatively connected to the coupling link 264 in the speaker verification system.

Figure 5B:
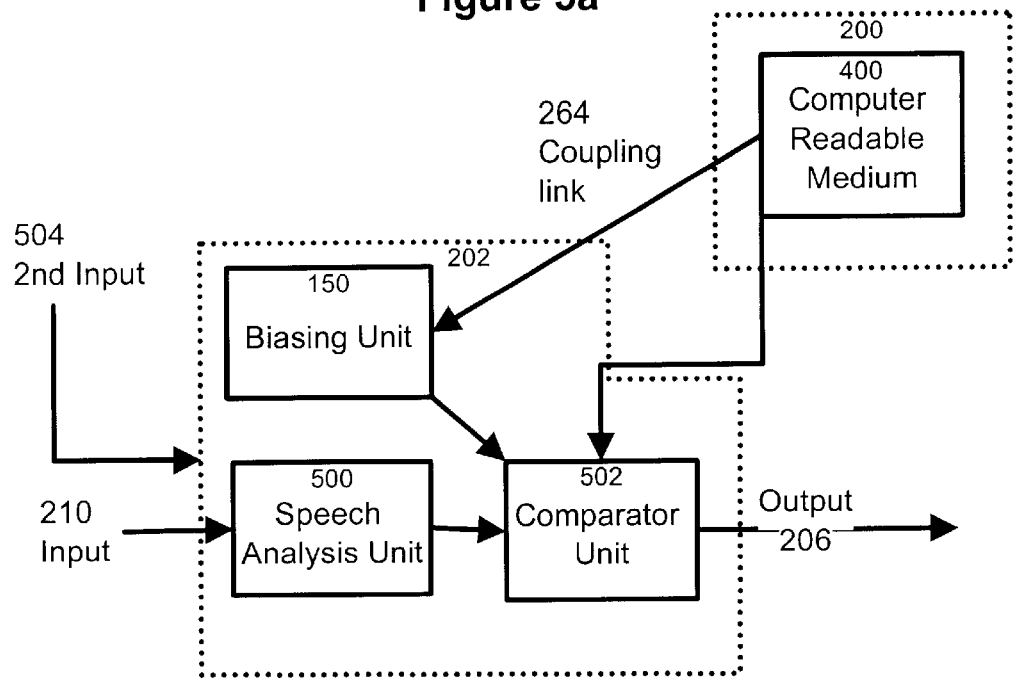
FIG. 5b shows a detailed block diagram of an alternative embodiment for the verification unit in accordance with an alternative embodiment of the invention.

An embodiment of the verification unit suitable for use with the second specific form of implementation of the training unit 200 is shown in FIG. 5b of the drawings. The verification unit 202 is indicative of an apparatus for performing speaker verification comprising a first input 210 for receiving a verification attempt for verification against a claimed speaker. The verification unit 202 further comprises a second input 264 indicative of a coupling link for receiving a speaker specific speech pattern associated with the claimed speaker. The verification unit 202 further comprises a processing unit coupled to the first 210 and second 264 inputs operative to process the verification attempt 214 on a basis of the speaker specific speech pattern. The processing unit generates a data element indicative of whether the speaker verification attempt is successful or unsuccessful. The verification unit 202 further comprises an output 206 for releasing the data element indicative of whether the speaker verification attempt is successful or unsuccessful. Optionally, the verification unit further comprises a second input 504 for receiving an identifier data element associated to a claimed speaker. The second input 504 has been described in the context of FIG. 5a of the drawings.

In a specific example of implementation, the processing unit comprises a speech analysis unit 500, a comparator unit 502 and a biasing unit 100. The speech analysis unit has an input coupled to the input 210 of the verification unit 202 and an output coupled to an input of the comparator unit 502. The comparator unit 502 has a second input operatively coupled to the computer readable medium 400 for receiving a record associate to a given speaker. The comparator unit 502 is also operatively coupled to the biasing unit 150 for receiving a speaker specific speech pattern and a biased normalizing template and optionally a speaker independent normalizing template associated to a claimed speaker. The functioning of the speech analysis unit 500 and of the comparator unit 502 has been described in the context of FIG. 5a of the drawings. The biasing unit 150 receives from the computer readable medium 400 a speaker specific speech pattern and outputs a biased normalizing template. The functioning of the biasing unit has been described previously in this specification.

Advantageously, by providing a verification unit 202 with a biasing unit 150 and computing the biased normalizing template on a per-need basis, a reduction in memory requirements can be achieved since the biased normalizing template is not a priori stored in memory.

The verification unit emits a data element indicative of the result through output 206. The data element may be in the form of an access grant or simply in the form of a yes/no type answer.

Figure 7:
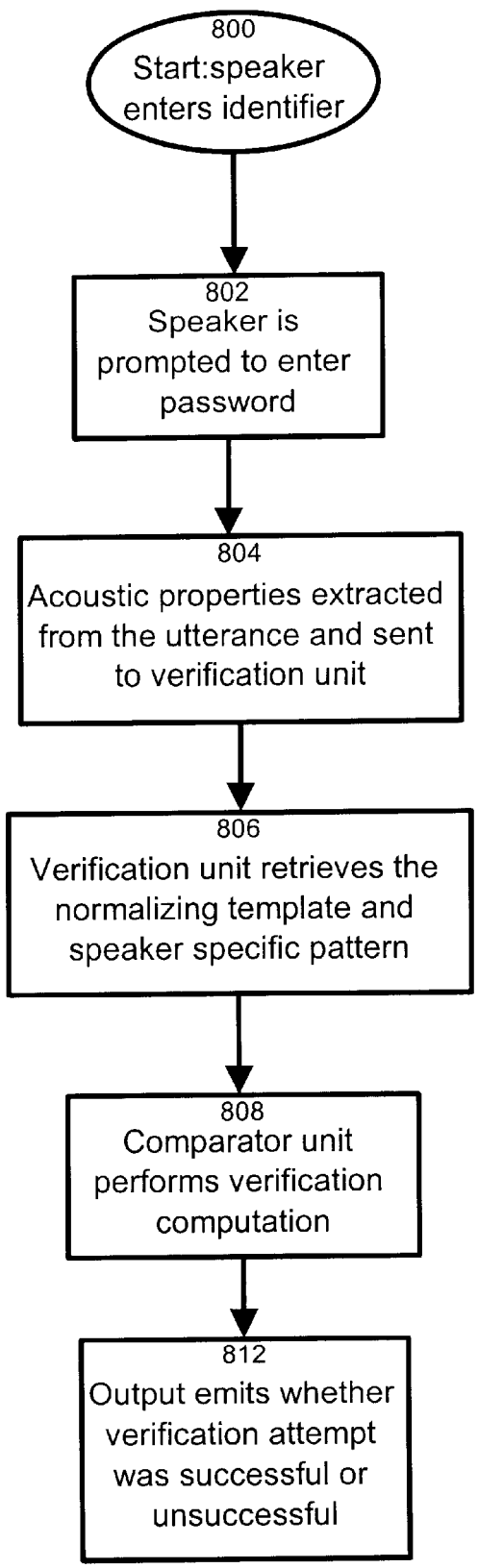
FIG. 7 shows a detailed flow chart of a verification method in accordance with an embodiment of the invention.

In a typical interaction, as shown in FIG. 7 of the drawings, a speaker provides 800 the speaker verification apparatus with an identifier data element associated to a claimed speaker. The speaker then enters 802 via a microphone or telephone set an utterance indicative of a verification attempt. The acoustic properties of the utterance are then extracted by the speech analysis unit 500 and forwarded to the comparator unit 502. The speaker verification unit 202 then makes use of the identifier data element received at step 800 to retrieve from a computer readable medium the record associated to the claimed speaker. The verification is then performed in the comparator unit 502 using the methods previously described. The speaker verification system then emits 812 a data element indication of whether the verification attempt was successful or unsuccessful.

In specific context of implementation, the speaker verification system such as described above is a component of a security system.

Figure 8:
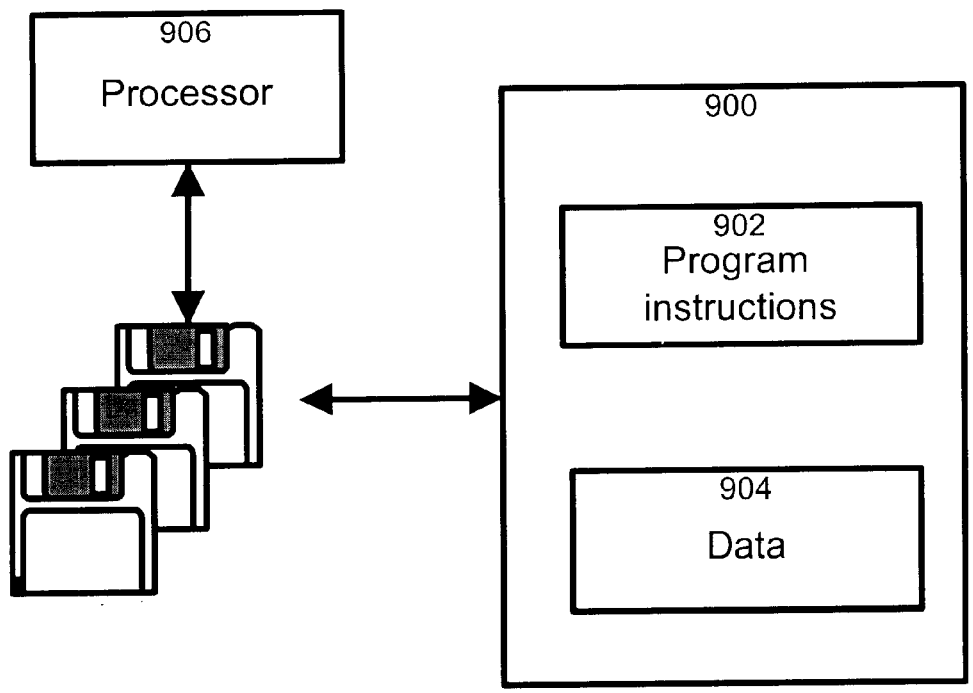
FIG. 8 shows an apparatus for creating a biased normalizing template in accordance with an embodiment of the invention.

The above-described method described in the specification can also be implemented on any suitable computing platform as shown in FIG. 8. Such a computing platform typically includes a processor 906 and a memory or computer readable medium 900 connected to the processor 906 by a data communication bus. The memory stores the data 904 and the instructions of the program element 902 implementing the functional blocks depicted in the drawings and described in the specification. In a specific example, the program element 902 implements the biasing unit 150. In another specific example, the program element 902 is operative for generating a pair of data elements as described in connection with the apparatus in FIG. 3 and the method in FIG. 6 of the drawings. In a specific example, the reference speaker independent model set is stored in the data portion 904 of the memory 900. The program element 902 operates on the data 904 in accordance with the algorithms described above to generate a pair of data elements suitable for use in a speaker verification system using the techniques described in this specification.

Although the present invention has been described in considerable detail with reference to certain preferred embodiments thereof, variations and refinements are possible without departing from the spirit of the invention. Therefore, the scope of the invention should be limited only by the appended claims and their equivalents.

What is claimed is:

1. An apparatus for creating a biased normalizing template suitable for use by a speaker verification system to authenticate a speaker based on a speech pattern, the speech pattern being representative of a first set of speech characteristics, said apparatus comprising:
    an input for receiving an input signal representative of a speech pattern from a given speaker;
    a processing unit coupled to said input for receiving said input signal, said processing unit being operative for processing said input signal and a first data element representative of a speaker independent normalizing template representative of a second set of speech characteristics to derive a second data element representative of an altered version of the user independent normalizing template, said second data element forming a biased normalizing template representative of a third set of speech characteristics, where the third set of speech characteristics is a combination of the first set of speech characteristics and the second set of speech characteristics;
    an output for releasing an output signal conveying the biased normalizing template suitable for use by a speaker verification system.

2. An apparatus as defined in claim 1, wherein the speech pattern is selected from the group consisting of speech models and vectors in a mean parameter sub-space.

3. An apparatus as defined in claim 2, wherein the first set of speech characteristics and the second set of speech characteristics define extremes of a range of speech characteristics, the range of speech characteristics including the third set of speech characteristics.

4. An apparatus as defined in claim 3, wherein said processing unit is further operative for processing the input signal to derive the first data element representative of the speaker independent normalizing template representative of the second set of speech characteristics.

5. An apparatus as defined in claim 4, wherein said processing unit is operative to process the input signal on a basis of a reference speaker independent model set to derive the first data element.

6. An apparatus as defined in claim 3, wherein said input is a first input, said apparatus comprising a second input for receiving a signal conveying the first data element.

7. A speaker verification system comprising the apparatus defined in claim 1.

8. An apparatus for generating a pair of data elements, namely a first element representative of a speaker specific speech pattern and a second element representative of a biased normalizing template, the pair of data elements being suitable for use in a speaker verification system, said apparatus comprising:

a) an input for receiving an audio signal derived from a spoken utterance forming a training token associated with a given speaker;
b) a processing unit coupled to said input, said processing unit being operative for:
    processing the audio signal on a basis of a reference speaker independent model set to derive a speaker independent normalizing template;
    processing the audio signal on a basis of the reference speaker independent model set for generating a speaker specific speech pattern;
    processing the speaker specific speech pattern and the speaker independent normalizing template to derive a biased normalizing template;
c) an output for releasing a signal indicative of the pair of data elements in a format suitable for use by a speaker verification system.

9. An apparatus as defined in claim 8, wherein the speaker specific pattern is indicative of a first set of speech characteristics, the speaker independent normalizing template is indicative of a second set of speech characteristics, the biased normalizing template is indicative of third set of speech characteristics, the first set of speech characteristics and the second set of speech characteristics defining extremes of a range of speech characteristics, the range of speech characteristics including the third set of speech characteristics.

10. An apparatus as defined in claim 8, further comprising a computer readable medium coupled to said output for storing the pair of data elements.

11. An apparatus as defined in claim 10, wherein said input is a first input, said apparatus comprises a second input for receiving a signal conveying a speaker identification data element, said processing unit being operative to store the speaker identification data element on said computer readable medium and establish a link between the speaker identification data element stored on said computer readable medium and the pair of data elements.

12. An apparatus as defined in claim 11, wherein said computer readable medium holds a data structure containing a plurality of pairs of data elements and a plurality of speaker identifier data elements associated to respective ones of said pairs of data elements.

13. An apparatus as defined in claim 8, wherein said processing unit comprises:
    a) a speaker specific speech pattern generator unit operative for processing the input signal on a basis of the reference speaker independent model set to generate said speaker specific speech pattern;
    b) a speaker independent template generator unit operative for processing the input signal on a basis of the reference speaker independent model set to derive the speaker independent normalizing template;
    c) a biasing unit coupled to said speaker independent template generator unit and to said speaker specific speech pattern generator unit, said biasing unit being operative to process the speaker specific speech pattern and the speaker independent normalizing template to derive the biased normalizing template.

14. An apparatus as defined in claim 13, wherein the speaker specific speech pattern generator unit uses a maximum a posteriori adaptation method to derive the speaker specific pattern.

15. A speaker verification system comprising the apparatus of claim 8.

16. A method for generating a pair of data elements, namely a first element representative of a speaker specific speech pattern and a second element representative of a biased normalizing template, the pair of data elements being suitable for use in a speaker verification system, said method comprising:

a) receiving an audio signal derived from a spoken utterance forming a training token associated with a given speaker;

b) processing the audio signal on a basis of a reference speaker independent model set to derive a speaker independent normalizing template;

c) processing the training token on a basis of a reference speaker independent model set for generating a speaker specific speech pattern;

d) processing the speaker specific speech pattern and the speaker independent normalizing template to derive a biased normalizing template;

e) releasing a signal indicative of the pair of data elements in a format suitable for use by a speaker verification system.

17. A method as defined in claim 16, wherein the speaker specific pattern is indicative of a first set of speech characteristics, the speaker independent normalizing template is indicative of a second set of speech characteristics, the biased normalizing template is indicative of third set of speech characteristics, the first set of speech characteristics and the second set of speech characteristics defining extremes of a range of speech characteristics, the range of speech characteristics including the third set of speech characteristics.

18. A method as defined in claim 17, further comprising storing the pair of data elements on a computer readable medium.

19. A method as defined in claim 18, further comprising
receiving a signal conveying a speaker identification data element;
storing the speaker identification data element on the computer readable medium;
establishing a link between the speaker identification data element stored on the computer readable medium and the pair of data elements.

20. A method as defined in claim 17, further comprising generating the speaker specific speech pattern using a maximum a posteriori adaptation method on the basis of the speaker independent normalizing template.

21. A computer readable medium comprising a program element suitable for execution by a computing apparatus for generating a pair of data elements, namely a first element representative of a speaker specific speech pattern and a second element representative of a biased normalizing template, the pair of data elements being suitable for use in a speaker verification system, said computing apparatus comprising:

a memory unit for storing an electronic representation of a reference speaker independent model set;

a processor operatively connected to said memory unit, said program element when executing on said processor being operative for implementing:

a) an input for receiving an audio signal derived from a spoken utterance forming a training token associated with a given speaker;

b) a training unit coupled to said input, said training unit being operative for:
processing the audio signal on a basis of a reference speaker independent model set to derive a speaker independent normalizing template;
processing the audio signal on a basis of the reference speaker independent model set for generating a speaker specific speech pattern;
processing the speaker specific speech pattern and the speaker independent normalizing template to derive a biased normalizing template;

c) an output for releasing a signal indicative of the pair of data elements in a format suitable for use by a speaker verification system.

22. A computer readable medium as defined in claim 21, wherein the speaker specific pattern is indicative of a first set of speech characteristics, the speaker independent normalizing template is indicative of a second set of speech characteristics, the biased normalizing template is indicative of third set of speech characteristics, the first set of speech characteristics and the second set of speech characteristics defining extremes of a range of speech characteristics, the range of speech characteristics including the third set of speech characteristics.

23. A computer readable medium as defined in claim 22, further comprising a data storage unit operatively coupled to the output for storing the pair of data elements.

24. A computer readable medium as defined in claim 23, wherein said input is a first input, said program element when executing on said processor being further operative for implementing a second input for receiving a signal conveying a speaker identification data element, said program element being operative to instruct said processor store the speaker identification data element on the data storage unit and establish a link between the speaker identification data element stored on said data storage unit and the pair of data elements.

25. A computer readable medium as defined in claim 24, wherein said data storage unit holds a data structure containing a plurality of pairs of data elements and a plurality of speaker identifier data elements associated to respective ones of said pairs of data elements.

26. A computer readable medium as defined in claim 22, wherein the program element is further operative for implementing a maximum a posteriori adaptation method to derive the speaker specific pattern.

27. An apparatus for creating a biased normalizing template suitable for use by a speaker verification system to authenticate a speaker based on a speech pattern, the speech pattern being representative of a first set of speech characteristics, said apparatus comprising:

means for receiving an input signal representative of a speech pattern from a given speaker;

means for processing said input signal and a first data element representative of a speaker independent normalizing template representative of a second set of speech characteristics to derive a second data element representative of an altered version of the user independent normalizing template, said second data element forming a biased normalizing template representative of a third set of speech characteristics, where the third set of speech characteristics is a combination of the first set of speech characteristics and the second set of speech characteristics;

means for releasing an output signal conveying the biased normalizing template suitable for use by a speaker verification system.

28. A computer readable medium containing a verification database comprising a plurality of pairs of data elements generated by the method defined claim 16.

* * * * *